US009640024B2

(12) United States Patent
Hornik

(10) Patent No.: US 9,640,024 B2
(45) Date of Patent: May 2, 2017

(54) SYSTEM AND METHOD FOR MULTIPLE ADJUSTING SYMBOL CHANGES DURING A WAGERING GAME

(71) Applicant: WMS Gaming Inc., Waukegan, IL (US)

(72) Inventor: Jeremy Hornik, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 219 days.

(21) Appl. No.: 14/607,697

(22) Filed: Jan. 28, 2015

(65) Prior Publication Data

US 2016/0217647 A1 Jul. 28, 2016

(51) Int. Cl.
*G06F 17/00* (2006.01)
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/3216* (2013.01); *G07F 17/34* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 4,184,683 | A | 1/1980 | Hooker | 273/143 R |
| 4,198,052 | A | 4/1980 | Gauselmann | 273/143 R |
| 5,580,053 | A | 12/1996 | Crouch | 463/20 |
| 5,611,535 | A | 3/1997 | Tiberio | 273/143 R |
| 5,976,016 | A | 11/1999 | Moody et al. | 463/13 |
| 6,241,607 | B1 | 6/2001 | Payne et al. | 463/20 |
| 6,261,178 | B1 | 7/2001 | Bennett | 463/20 |
| 6,413,162 | B1 | 7/2002 | Baerlocher et al. | 463/20 |
| 6,544,120 | B2 | 4/2003 | Ainsworth | 463/20 |
| 6,604,999 | B2 | 8/2003 | Ainsworth | 463/20 |
| 6,676,511 | B2 | 1/2004 | Payne et al. | 463/20 |
| 7,001,274 | B2 | 2/2006 | Baerlocher et al. | 463/20 |
| 7,309,281 | B2 | 12/2007 | Baerlocher et al. | 463/20 |
| 7,309,282 | B2 | 12/2007 | Baerlocher et al. | 463/20 |
| 7,347,777 | B2 | 3/2008 | Gauselmann | 463/25 |
| 7,387,570 | B2 | 6/2008 | Randall | 463/20 |
| 7,393,277 | B2 | 7/2008 | Jackson | 463/20 |

(Continued)

*Primary Examiner* — Ronald Laneau
(74) *Attorney, Agent, or Firm* — Marc Thompson

(57) ABSTRACT

A gaming system performs a wagering game by determining an outcome, based at least in part, on one or more random elements. The wagering game uses a plurality of symbol bearing reels that includes at least one adjustable reel having an adjustable reel strip with one or more adjusting symbol positions thereon. When a wagering game is initiated and while the symbol bearing reels are spinning, a series of symbols are sequentially displayed by the adjustable reels at the adjusting symbol positions. The symbols may optionally increase in value as displayed to enhance player anticipation. The number and location of adjustable reels, the number and location of adjusting symbol positions on each adjustable reel, and the symbols displayed at the adjusting symbol positions may be randomly or statically determined. During the wagering game, the order of display of the series of symbols at the adjusting symbol locations may be random or based on previously displayed symbols.

20 Claims, 6 Drawing Sheets

(56) References Cited

U.S. PATENT DOCUMENTS

| | | | | |
|---|---|---|---|---|
| 7,431,645 | B2 | 10/2008 | Han et al. | 463/16 |
| 7,494,413 | B2 | 2/2009 | Singer et al. | 463/20 |
| 7,780,519 | B2 | 8/2010 | Gomez et al. | 463/25 |
| 8,197,329 | B2 | 6/2012 | Englman et al. | 463/20 |
| 8,641,508 | B2 | 2/2014 | Yoshimi | 463/20 |
| 8,747,207 | B2 | 6/2014 | Thomas et al. | 463/16 |
| 8,974,283 | B2 * | 3/2015 | Jaffe | G07F 17/3213 463/16 |
| 9,361,763 | B1 * | 6/2016 | Aoki | G07F 17/326 |
| 2002/0155882 | A1 | 10/2002 | Baerlocher et al. | 436/20 |
| 2004/0033827 | A1 | 2/2004 | Gilmore et al. | 436/20 |
| 2006/0058097 | A1 | 3/2006 | Berman et al. | 436/20 |
| 2006/0066051 | A1 | 3/2006 | Nicely | 273/292 |
| 2006/0111174 | A1 | 5/2006 | Baerlocher et al. | 463/20 |
| 2006/0154717 | A1 | 7/2006 | Jackson | 463/20 |
| 2006/0160613 | A1 | 7/2006 | Hornik et al. | 463/25 |
| 2007/0060255 | A1 | 3/2007 | Baerlocher et al. | 463/16 |
| 2015/0302686 | A1 * | 10/2015 | Jaffe | G07F 17/3213 463/20 |
| 2015/0356833 | A1 * | 12/2015 | Aoki | G07F 17/34 463/20 |
| 2016/0063806 | A1 * | 3/2016 | Collette | G07F 17/326 463/21 |

* cited by examiner

SYSTEM AND METHOD FOR MULTIPLE ADJUSTING SYMBOL CHANGES DURING A WAGERING GAME

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a wagering game mechanic involving a changing symbol during the presentation of the wagering game to enhance player anticipation.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

The gaming industry depends upon player participation. Players are generally “hopeful” players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

SUMMARY OF THE INVENTION

According to one aspect of the present invention, a gaming machine primarily dedicated to playing at least one casino wagering game is disclosed. The casino wagering game includes spinning a plurality of symbol bearing reels including at least one adjustable reel having an adjustable reel strip with one or more adjusting symbol positions thereon. The gaming machine comprises a secure gaming cabinet for housing components associated with the casino wagering game, an electronic display device, an electronic input device configured to receive a physical input from a player to initiate the casino wagering game and transform the input into an electronic data signal, and game-logic circuitry disposed within the gaming cabinet. The game-logic circuitry includes a random element generator configured to generate one or more random elements. The game-logic circuitry is configured to initiate the casino wagering game in response to the electronic data signal from the electronic input device. After initiation of the casino wagering game, a first symbol and a second symbol are selected from a plurality of symbols based, at least in part, on the one or more random elements. While spinning the at least one adjustable reel, any currently displayed symbol in the one or more adjusting symbol positions is replaced with the first symbol, thereby displaying the first symbol at the one or more adjusting symbol positions on the electronic display device. While spinning the at least one adjustable reel, any currently displayed symbol in the one or more adjusting symbol positions is replaced with the second symbol, thereby displaying the second symbol at the one or more adjusting symbol positions on the electronic display device. The plurality of reels are stopped to display a symbol combination, wherein the at least one adjustable reel displays the second symbol at the one or more adjusting symbol positions. An outcome of the casino wagering game based, at least in part, on the one or more random elements is determined, and an award is granted in response to the game outcome meeting a predetermined award criterion.

According to another aspect of the present invention, a gaming system primarily dedicated to playing at least one casino wagering game is disclosed. The casino wagering game includes spinning a plurality of symbol bearing reels including at least one adjustable reel having an adjustable reel strip with one or more adjusting symbol positions thereon. The gaming machine comprises a secure gaming cabinet for housing components associated with the casino wagering game, an electronic display device, an electronic input device configured to receive a physical input from a player to initiate the casino wagering game and transform the input into an electronic data signal, a random element generator configured to generate one or more random elements, and game-logic circuitry. The game-logic circuitry is configured to initiate the casino wagering game in response to the electronic data signal from the electronic input device. After initiation of the casino wagering game, a first symbol and a second symbol are selected from a plurality of symbols based, at least in part, on the one or more random elements. While spinning the at least one adjustable reel, any currently displayed symbol in the one or more adjusting symbol positions is replaced with the first symbol, thereby displaying the first symbol at the one or more adjusting symbol positions on the electronic display device. While spinning the at least one adjustable reel, any currently displayed symbol in the one or more adjusting symbol positions is replaced with the second symbol, thereby displaying the second symbol at the one or more adjusting symbol positions on the electronic display device. The plurality of reels are stopped to display a symbol combination, wherein the at least one adjustable reel displays the second symbol at the one or more adjusting symbol positions. An outcome of the casino wagering game is determined based, at least in part, on the one or more random elements, and an award is granted in response to the game outcome meeting a predetermined award criterion.

According to another aspect of the invention, a computer-implemented method in a gaming system comprises primarily dedicated to playing at least one casino wagering game is disclosed. The casino wagering game includes spinning a plurality of symbol bearing reels including at least one adjustable reel having an adjustable reel strip with one or more adjusting symbol positions thereon. The gaming system includes a secure gaming cabinet, a random element generator, game-logic circuitry, an electronic display device, and an electronic input device. The electronic display device and the electronic input device are coupled to the gaming cabinet. The computer-implemented method comprises generating one or more random elements with the random element generator. Responsive to a physical input to the electronic input device, a wager input is received to initiate the casino wagering game, resulting in spinning the plurality of reels. After initiation of the casino wagering game, the game-logic circuitry selects a first symbol and a second symbol from a plurality of symbols based, at least in part, on the one or more random elements. While spinning the at least one adjustable reel, the game-logic circuitry replaces any currently displayed symbol in the one or more adjusting symbol positions with the first symbol, thereby displaying the first symbol at the one or more adjusting symbol positions on the electronic display device. While spinning the at least one adjustable reel, the game-logic circuitry replaces any currently displayed symbol in the one or more adjusting symbol positions with the second symbol, thereby displaying the second symbol at the one or more adjusting symbol positions on the electronic display device. The game-logic circuitry stops the plurality of reels to display a symbol combination, wherein the at least one adjustable reel displays the second symbol at the one or more adjusting symbol positions. The game-logic circuitry determines an outcome of the casino wagering game based, at least in part, on the one or more random elements, and grants an award in response to the game outcome meeting a predetermined award criterion.

According to yet another aspect of the invention, computer readable storage media is encoded with instructions for directing a gaming system to perform the above methods.

According to still another aspect of the invention, the above gaming system is incorporated into a single, free-standing gaming terminal.

Additional aspects of the invention will be apparent to those of ordinary skill in the art in view of the detailed description of various embodiments, which is made with reference to the drawings, a brief description of which is provided below.

Figure 1:
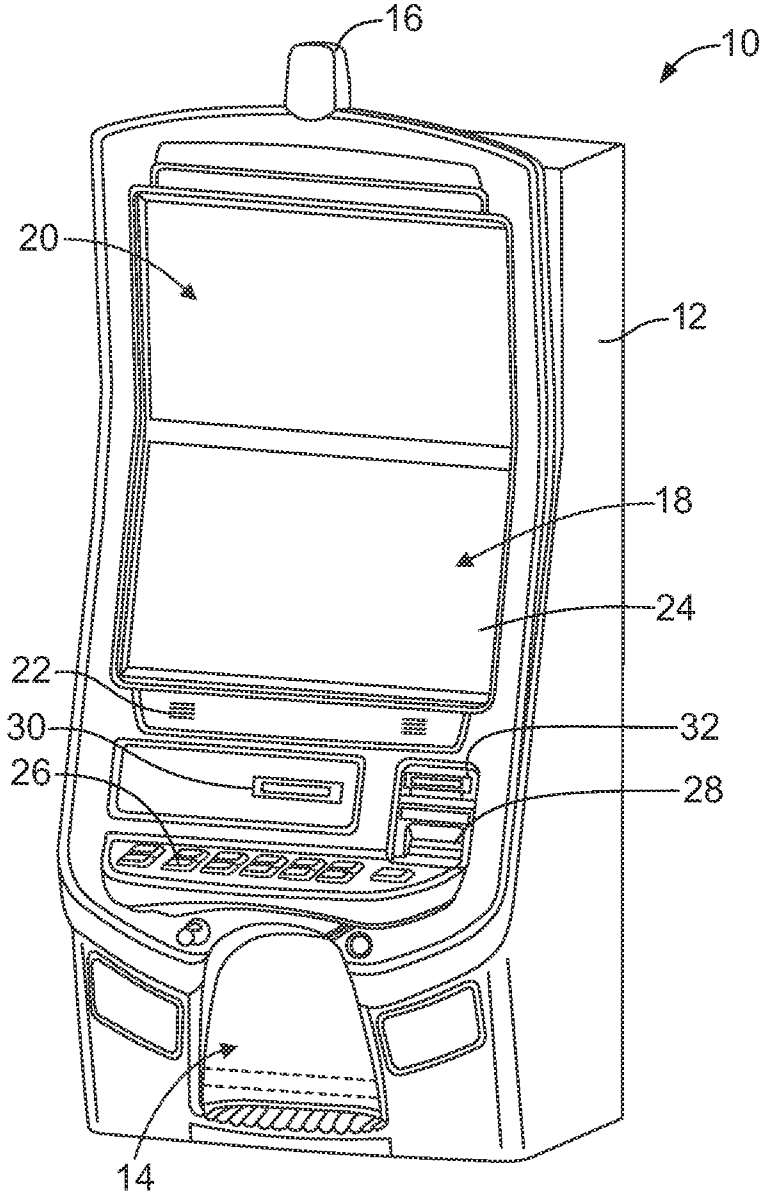
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation.

For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. No. 6,517,433, U.S. Pat. No. 8,057,303, and U.S. Pat. No. 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
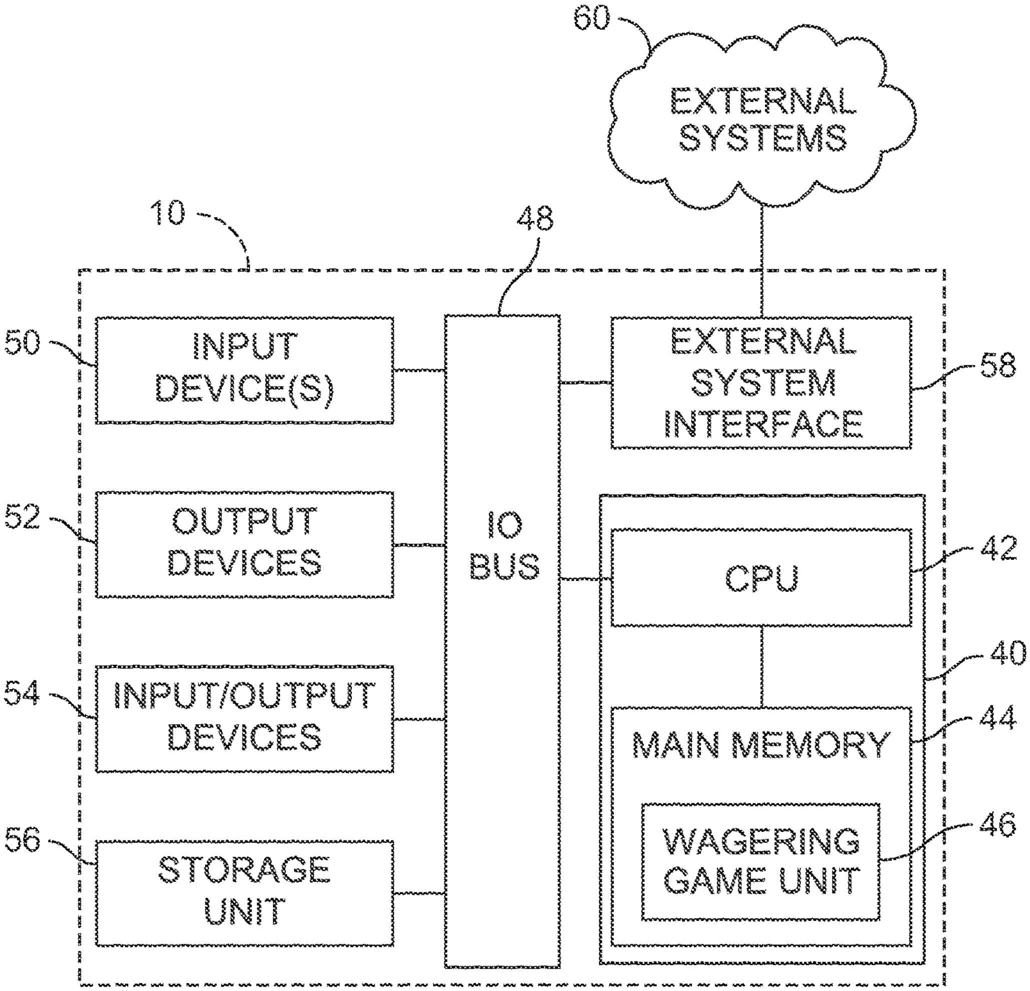
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
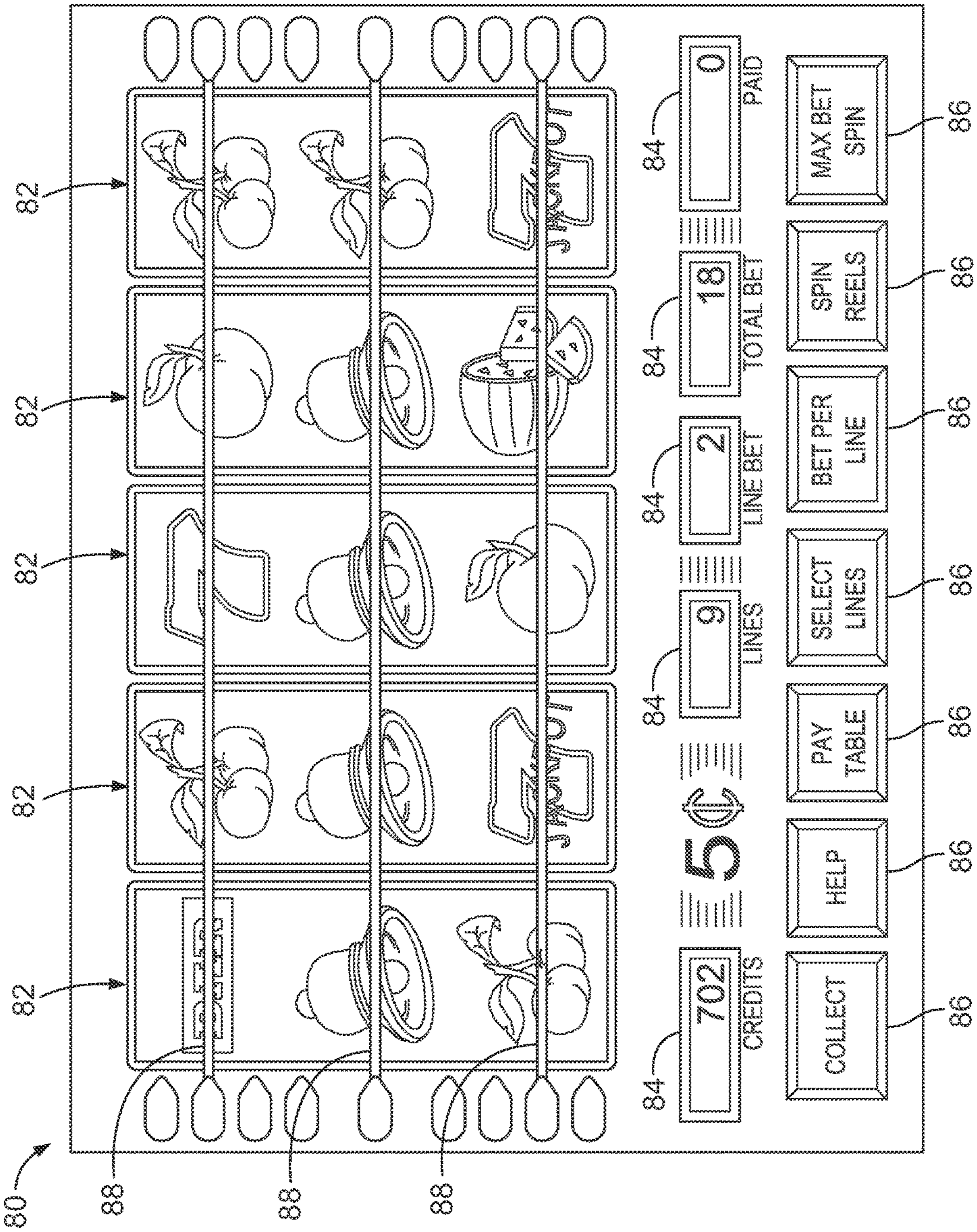
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

In one embodiment, the present invention provides a wagering game mechanism which heightens player anticipation of a video slot machine casino wagering game by changing the symbol that is displayed at adjusting symbol positions on an adjustable reel of the wagering game. As a plurality of symbol bearing reels spin during the wagering game, the symbol displayed at the adjusting symbol positions of at least one adjustable reel changes at least once during the spin of the adjustable reel. The graphical symbols assigned to display at each of the adjusting symbol positions are sometimes referred to as "adjusting symbols" due to their changing behavior.

The wagering game may randomly determine changes of the adjusting symbols from one symbol to another symbol while the reels of the wagering game are spinning. The change may include visual details such as the timing of the changes and which symbols are displayed at the adjusting symbol positions. If there are multiple adjustable reels spinning at the same time, the multiple adjustable reels may operate together or independently. The adjusting symbols presented at the adjusting symbol positions on a given adjustable reel may be randomly determined to change once or multiple times during the spinning of the adjustable reel. Graphical symbols that are displayed at the adjusting symbol positions of each adjustable reel may be randomly determined or may be selectively chosen to coordinate with the value of another randomly chosen symbol.

The probability of changing the adjusting symbols on a given adjustable reel may be weighted differently depending on what symbol(s) are chosen for the adjusting symbols. Further, the number of adjusting symbol positions on an adjustable reel, along with their positions on the adjustable reel, may also be randomly determined. During this determination, the adjustable reel may expand to include a series of adjustable reel positions, or the adjustable reel positions may replace or overwrite symbols already present on the adjustable reel.

When the reels of the wagering game stop spinning, all adjusting symbol positions on a given adjustable reel are unified to display the same symbol as part of the wagering game outcome. In one embodiment, all adjusting symbol positions on each of the adjustable reels display the same symbol. The outcome of the wagering game results in a tangible reward in accordance with the outcome meeting predefined criteria, and may or may not involve the adjusting symbols at the adjusting symbol positions of the adjusting reel(s) to determine the tangible award.

Figure 4:
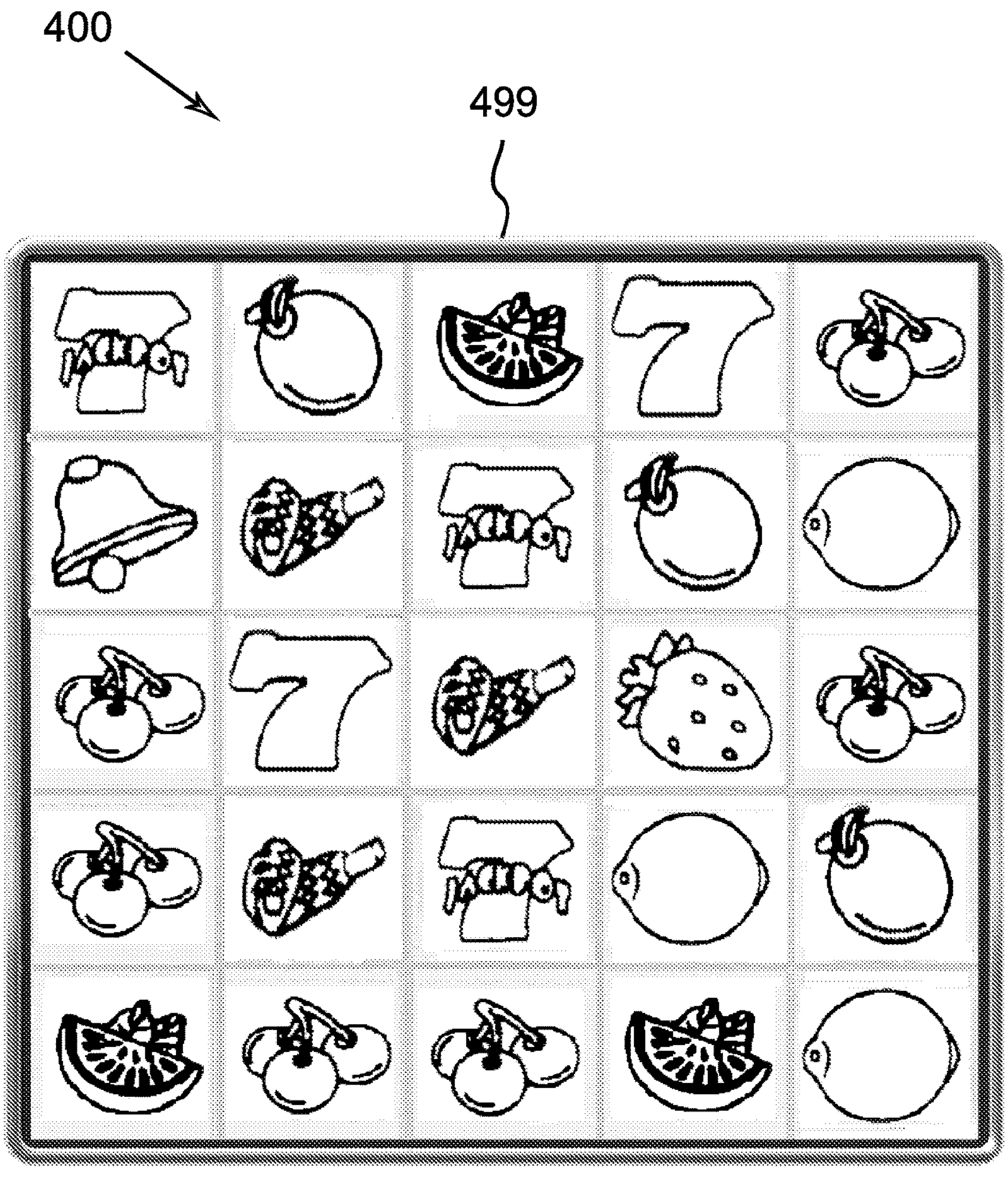
FIG. 4 is an image of an exemplary basic-game screen of a wagering game displayed on a gaming machine showing a game-outcome symbol array comprising a set of stand-alone array elements, according to an embodiment of the present invention.

Referring now to FIG. 4, an image of an exemplary portion of a game screen 400 of a wagering game displayed on a gaming machine is shown in one embodiment. The game screen 400 contains a five-by-five graphical symbol array 499, and each array element is a distinct reel displaying a corresponding symbol. That is, each of the twenty-five symbol array elements shown in symbol array 499 has a corresponding reel that are used to determine a game-outcome symbol once the reels stop spinning using one or more random elements (e.g., numbers).

Each reel has a corresponding reel strip thereon. A reel strip defines a set of symbols that populate the corresponding reel; the reel strip defines the set of symbols that may potentially become a game-outcome symbol for the particular reel based on one or more random elements. Thus, the reel strip of a given reel defines a probability of selection for each symbol on the corresponding reel. Distinct reels having differing reel strips are inherently different reels.

When a wagering game is initiated, one or more random elements (e.g., numbers) are determined and are used to determine or derive game-outcome symbols for each array element of the symbol array 499. During presentation of the wagering game, the array elements of the symbol array 499 may appear to spin prior to the display of the game-outcome symbol for each array element. Other types of visual presentation may accompany the virtual spinning of the reel having a corresponding reel strip defining the potential game-outcome symbols for each array element. As the reel for each array element of the symbol array 499 stops spinning, a particular game-outcome symbol from an assigned, corresponding reel strip is displayed at each array element location.

In one embodiment, the reel for each distinct symbol array element is different from all other array element reels; that is, no two symbol array elements in the symbol array use the same reel (i.e., identical reel strips) to determine game-outcome symbols for the array elements. In another embodiment, the same reel (i.e., using an identical reel strip) may be used to generate a corresponding game-outcome symbol for more than one array element. In this latter embodiment, the selection of the game-outcome symbol for a particular array element may be independent from all other array elements, even though multiple array elements may use the same reel strip to determine game-outcome symbols based on random elements. In still other embodiments, multiple symbol array elements using identical reels with identical reel strips may be linked, resulting in related game-outcome symbols for the linked symbol array elements.

In one embodiment, the reel for each array element of the symbol array 499 is assigned a corresponding default reel strip defining the set of potential game-outcome symbols for display at the particular array location when displaying the wagering game outcome. In other embodiments, a set of reel strips corresponding to the set of symbol array elements are randomly selected based upon one or more random elements. In another embodiment, the reels for the symbol array elements are predetermined for a particular instance of the wagering game.

In one embodiment, a reel for a particular symbol array element may include a reel strip having a set of graphical symbols in a particular order that provides probabilistic weights for each potential graphical symbol on the reel. Defining probabilistic weights for a given reel having a predetermined reel strip may be achieved either through a numerical mapping to particular reel stop position values (each indicating a symbol for display) or a set of duplicated symbols as defined by the reel strip. Alternatively, a set of graphical symbols and probabilistic weights may be specified in a one (or more) dimensional array used to define and populate a reel with a set of graphical symbols (i.e., a reel strip) used for weighted, random selection of a game-outcome symbol for the particular reel.

In one embodiment, a wagering game is initiated that requires the symbol array elements, using their respective reels having corresponding reel strips, to determine a wagering game outcome including game-outcome symbols for each of the symbol array elements following a graphical presentation phase. The wagering-game-presentation phase may include the use of "spin profiles" to provide presentation and visual templates for various types of array element display and coordination during display of the wagering game. In a simple example, a corresponding spin profile may be selected for each array element having an independent reel of the wagering game, where each corresponding spin profile providing the details for visual presentation for a respective array element having an independent reel. In another embodiment, a spin profile may be selected for sets of independent reels for coordinated display of these reel sets. In other embodiments, a single spin profile may describe and dictate the motion and display of the entirety of the symbol array and all constituent components. A large variety of spin profiles may be defined and be available for selection for a wagering game providing coordination of visualization of the motion and display of the array elements and the symbol array as a whole during the wagering game. Spin profiles may also include graphical output that impacts game-outcome reveals and the way the wagering game is presented and graphically executed.

A spin profile may dictate how one or more array elements that are still spinning are visually displayed during the wagering game, additionally in response to the motion of other array elements. For example, a spin profile may dictate that the appearance of two or more special "bonus" symbols (as game-outcome symbols) may cause an increase in the time of spinning for some or all of the remaining array elements to enhance player anticipation and excitement. In one embodiment, when one (or more) adjustable reels (reels having symbol positions on the reel strip that change over time) are part of symbol array, display of the motion (rotation) of the adjustable reels is extended. Extending duration and display of the spinning motion of the adjustable reels may be performed to increase aesthetics, player anticipation, and visual evolution of the value of the array element and wagering game game-outcome. For example, an adjustable reel may change the display of a symbol at the adjusting symbol positions on the reel into symbols having increased value as the spinning occurs. To this end, spin profiles may include motion parameters that control, manage, or establish motion and display of each individual reel (single array element), a set of reels (plural array elements), or the entire symbol array. The motion parameters may include velocity or acceleration values for one or more reels at given times during a spinning presentation, potentially using a set of motion parameters correlated to a start and a finish of one of a set of time periods. The motion parameters may include a velocity at the start of the time period and a velocity at the finish of the time period along with a perceived acceleration for one or more of the symbol array reels during motion.

More than one spin profile may be used together to construct a unified presentation of the symbol array of the wagering game in a modular fashion. For example, the selection of one or more spin profiles for one or more array elements, dependent or not upon location in the symbol array, may also impact the spin profiles selected for other array elements and areas of the symbol array during the wagering game. In operation, one or more selected spin profiles describe how the array elements will be displayed as the wagering game is initiated and begins (e.g., indicating adjustable reels), during the spinning and resolving of the wagering game (e.g., indicating adjustable reels, symbol display changes, array element rotation speed and duration, coordinated presentation, and other alterations of visuals of the reel strips), and as the wagering game concludes by rendering the wagering game-outcome (e.g., the stopping of the reels, changing of presentation of reel symbols when stopped, etc.).

After the reels of the symbol array 499 stop spinning, each array element of the symbol array 499 displays a game-outcome symbol (randomly) selected from the set of available symbols on the corresponding reel strip of the respective reel. After a game-outcome symbol for every array element of the symbol array 499 is determined and displayed, an outcome for this portion of the wagering game may be displayed. The wagering game outcome includes a determination of the symbol array 499 meeting predetermined criteria, and may additionally result in one or more events to occur. Additional wagering game outcome events may include rewarding a tangible monetary award, awarding additional free spins of the wagering game, conducting a bonus (or additional) game, etc., or any combination of these.

Reels using a corresponding reel strip are used to display and reflect a random game-outcome symbol for each of the array elements of the wagering game. The game-outcome symbols are displayed by the array elements of symbol array 499 based on one or more random elements (e.g., random numbers generated by an RNG). In one embodiment, when a wagering game is performed, game logic circuitry generates one or more random elements and determines a visual game outcome symbol for each array element corresponding to a set of reel stop positions particular to each of the corresponding reels of the symbol array 499. The reel stop positions for a given reel specify values used to cause the reel to stop at a predetermined position in order to display a corresponding game-outcome symbol. That is, reel stop position values may be used to specify what symbol(s) are displayed by a given reel at a particular array element position when stopped, and may additionally be used to analyze and indicate whether the position of the reels (i.e., presented symbols) represent a winning game outcome when compared to a predetermined criteria (i.e., pay table).

In one embodiment, defining a reel strip for a reel for a given array location includes one or more adjusting symbols on an adjustable reel used to enhance player anticipation by changing the symbol and visual output of the adjusting symbols during the spin of the reels. One or more adjustable reels may be simultaneously used during a given wagering game. Accordingly, while using adjustable reels, a player will not immediately know what symbol the adjusting symbols will eventually generate as a game-outcome symbols as the reels are moving. During the spin execution, one (or more) symbols of the wagering game may be displayed at the adjusting symbol position on the adjustable reels, greatly enhancing player engagement and anticipation.

Figure 5:
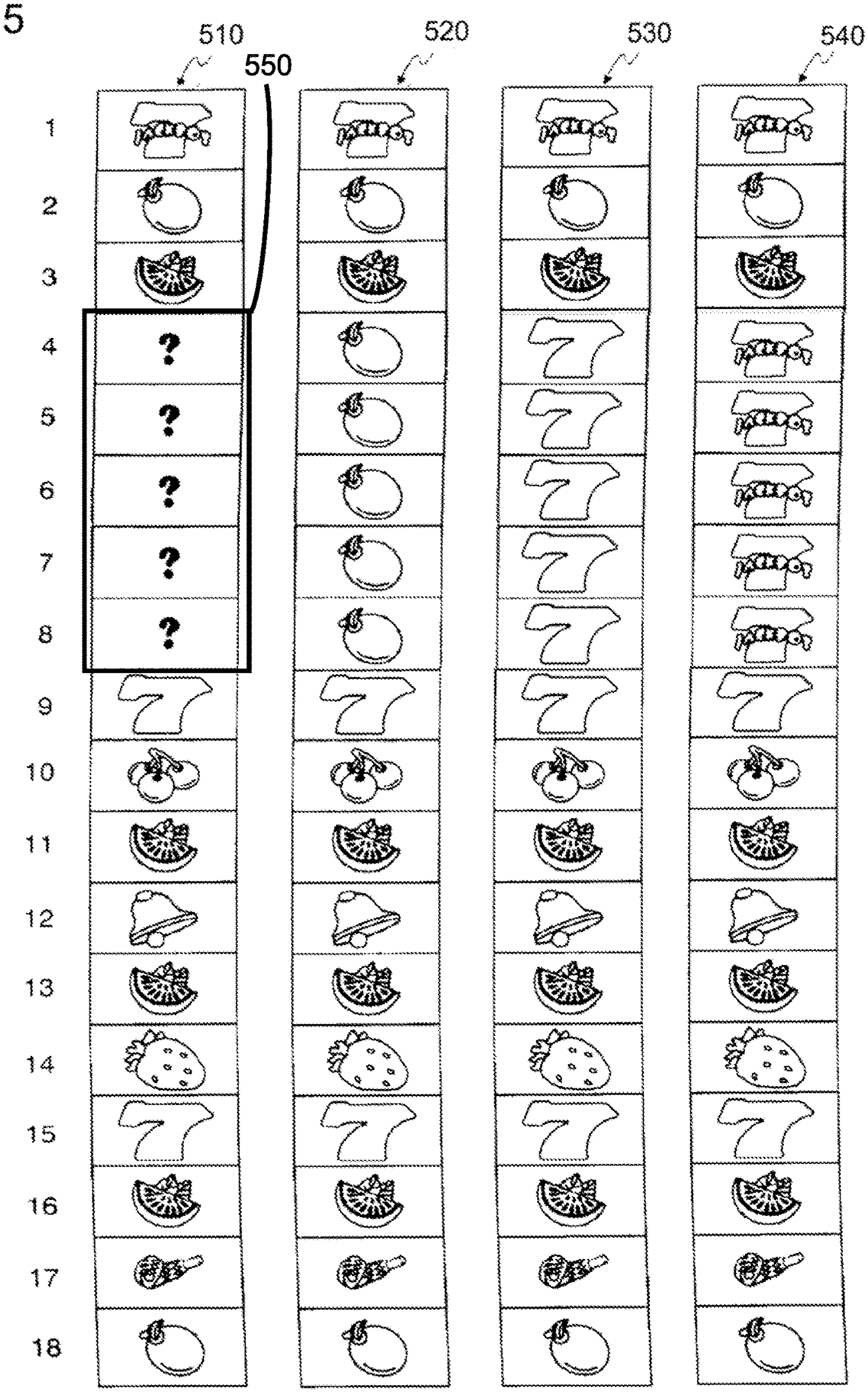
FIG. 5 is a representation of an adjustable reel having a set of adjusting symbols thereon at different stages of presentation during rotation of the adjustable reel during an instance of the wagering game, according to an embodiment of the present invention.

FIG. 5 shows a section of a reel strip 510-540 of an adjustable reel at various phases of a wagering game. The adjustable reel has a number of adjacent adjusting-symbol positions 550 on the reel strip 510-540. It is noted that the adjusting-symbol positions 550 displayed by the adjustable reel need not be displayed as "blank" or "undefined" as shown by adjustable reel in FIG. 5 (marked with a "?" symbol for ease of explanation). Instead, a specific symbol or, alternatively, a plurality of different symbols, is typically displayed at the adjusting-symbol positions 550 of the reel strip 510-540 of the adjustable reel when that section of the adjustable reel is displayed to the viewer as the reels are spinning or stopped. The adjustable reel may be located at one or more array element locations of the symbol array 499 of the wagering game.

In one embodiment, for example, when the wagering game is initiated, one (or more) of the array elements of the symbol array 499 reels of the wagering game may be configured using an adjustable reel. In this case, the adjustable reel includes a string of the "SEVEN" symbol at each of the adjusting-symbol positions 550 of adjustable reel strip 510, shown by the adjustable reel strip 530. Additionally, this particular symbol assignment may be a result of a prior random determination from the last instance of the wagering game. For example, in a case where the "SEVEN" symbol was the game-outcome symbol of one or more array elements of the symbol array 499 in the prior wagering game instance, the adjusting-symbol positions 550 of the displayed reel in the one or more array location display the symbols as shown in adjustable reel strip 530. As a new wagering game is initiated, one or more random elements are generated to determine what symbol(s) will be presented at the adjusting-symbol positions 550 of each adjustable reel while array elements implementing the adjustable reel are displayed.

For simplicity sake, only a single adjustable reel will be discussed, but any number of adjustable reels may be simultaneously implemented during a wagering game instance. An adjustable reel will have corresponding adjusting symbols displayed at each adjusting-symbol position 550 of the adjustable reel strip 510-540 of the adjustable reel for a respective array element. In the case of multiple array elements of the symbol array 499 using an adjustable reel having adjusting-symbol positions 550, a respective adjustable reel may be used for each of the array elements. Each array element having an adjustable reel may have symbols displayed at the adjusting-symbol positions 550 for the respective adjustable reel that are independent from the other adjustable reels (independently determined) or sets of the array elements or adjustable reels may be interrelated (e.g., dependent or copied).

In one embodiment, the generated random elements dictate that an adjustable reel for a given array element in the wagering game will display an "ORANGE" symbol at the adjusting-symbol positions 550 (as seen in adjustable reel strip 520) transitioning to a "SEVEN" symbol during the reel spin (as seen in adjustable reel strip 530), before further transitioning into the "7-JACKPOT" symbol (as seen in adjustable reel strip 540) as the adjustable reel stops spinning, displaying this game-outcome symbol at the conclusion of the wagering game. Accordingly, during this instance of the wagering game, the player will experience the adjustable reel displaying the a group of "ORANGE" symbols for a first period of time during the spin of the array element reel, a group of "SEVEN" symbols for a second period of time during the spin, and finally displaying the "7-JACKPOT" symbol prior to or simultaneously with the array element adjustable reel stopping the virtual spinning motion to display a game-symbol outcome for the array element. As mentioned prior, the use of spin profiles become very useful in this scenario by providing a way to increase anticipation of the player as the array elements using adjustable reels are spinning Through the use of spin profiles, the wagering game can ensure that motion of the reels (including adjustable reels) are coordinated such that the displayed symbol(s) at the adjusting-symbol positions 550 are shown transitioning during display of the reels. The spin profiles may use highlighting and/or animation to further enhance the use of adjustable reels having adjustable reel strips 510-540 and adjusting-symbol positions 550 for one or more array elements of the symbol array 499.

The step of transitioning the display of a "legacy" symbol of an adjustable reel (i.e., the symbol displayed at the adjusting-symbol positions 550 of an adjustable reel from a prior wagering game) into the "first" symbol of a new wagering game at the adjusting-symbol positions 550 of an adjustable reel is purely optional and case specific. For example, in cases where there are no adjusting-symbol positions 550 visible to the player at the initiation of the wagering game, the first displayed symbol at the adjusting-symbol positions 550 of an array element using an adjusting reel becomes trivial. In this case, the first symbol displayed at the adjusting-symbol positions 550 of a new wagering game will simply be a "first" determined symbol for display the adjusting-symbol positions 550 during rotation of the reels of the array elements of the symbol array 499. In a case where an adjustable reel having prior adjusting-symbol positions 550 thereon is visible, the adjusting-symbol positions 550 may simply maintain the symbol displayed until adjusting-symbol positions 550 are required to be displayed in the symbol array 499.

In another embodiment, a predetermined symbol may be chosen to initially indicate the adjusting-symbol positions 550 of an adjustable reel having the adjustable reel strip 510. For example, the wagering game may display a "?" symbol at the adjusting-symbol positions 550 of any adjustable reels by displaying adjustable reel strip 510. Alternatively, a series of images may be used to create an animation of the initial state of the adjusting-symbol positions 550, where no symbol is yet designated for display. As the wagering game is initiated and the array elements of the symbol array 499 display the reels spinning, the "?" symbol (or alternative symbol(s)) is shown when the adjusting-symbol positions 550 of the adjustable reel are displayed. The random elements generated to determine the game-outcome symbols of the wagering game (for example, using reel stop position values for each reel), including any adjusting symbols, may dictate transition of the adjusting-symbol positions 550 as the adjustable reel(s) are spinning. In this case, during the wagering game the array element(s) using the adjustable reel displays the "?" symbol initially at the adjusting-symbol positions 550 (shown by reel strip 510), followed by displaying the "ORANGE" symbol (reel strip 520), followed by the "SEVEN" symbol, (reel strip 530), finally transitioning into the "7-JACKPOT" symbol (reel strip 540).

It is noted that the sequence of symbols displayed at the adjusting-symbol positions 550 of the adjustable reel(s) may be arbitrary. It is also possible that the displayed (adjusting) symbols are randomly determined and are then sorted to be displayed in lowest to highest symbol value as each new symbol transition occurs. Alternatively, the symbols may be displayed in the order that they are determined. In this example, each new symbol displayed at the adjusting-symbol positions 550 of the adjustable reels has a higher value as defined by the pay table of the wagering game to increase anticipation. This progression of symbol value for adjustable reels 520-540 creates excitement in the playing experience as each symbol transition increases a potential award that the wagering game may provide in a winning scenario.

In a wagering game spin using adjustable reels having adjusting-symbol positions 550, visual display of the spinning reels may contain a preponderance of the symbols at one or more array element locations of the symbol array 499. In one embodiment, this causes a player to see an unusual amount of a particular symbol at the array element location (s) of the symbol array 499 while the reels are in motion. The adjusting symbols of the adjusting reels may change and transition multiple times during presentation of the spinning reels. Thus, a player may see a particular symbol appearing in large numbers at the beginning of the spin, but as the reels continue to spin the symbol may change to a better (i.e., higher valued) symbol. The increase in symbol value greatly enhances player anticipation of the result of the spin. Prior to the reels coming to rest, the adjusting symbols may change yet again to another better (perhaps WILD valued) symbol heightening player anticipation of the spin result yet again.

The adjusting symbols may be randomly determined to change during the wagering game or may be determined to change prior to movement and display of any reels at one or more array locations. As an adjusting symbol changes during movement of the reels, the adjusting symbol may change up, down, or not at all in value of the hierarchy of the symbols defined for the wagering game according to the pay table. Depending upon random elements, an adjusting symbol may change once, multiple times, or not at all during a given wagering game. The chance that an adjusting symbol will change may additionally be weighted, being wholly or partially dependent on the adjusting symbol that is currently chosen.

The selection of symbols to populate the adjusting symbol positions 550 of a reel strip 510 for a given reel and array location may include the use of a look-up table using random elements to determine the symbol changes that the adjusting symbols will undergo during the presentation process. Alternatively, there may be random determinations that provide scripted symbol changes, or multiple random elements for symbol selection that may or may not include actual reel stop values to coordinate with various reel configurations and reel strips for specific array elements in order to utilize or maximize display or presentation of adjusting symbol elements on adjustable reels. The further provision for spin profiles to dictate how the reels of the wagering game will move, independently and in conjunction with adjustable reels, provide a unified way to visually coordinate the motion of all the reels during game play.

The number of adjusting-symbol positions 550 on a given adjustable reel strip 510 for a given reel (or array element location) may also be randomly determined, and may also be weighted in accordance with a number of factors. This may include designating specific adjustable reels in one or more designated regions of the symbol array 499 for a particular wagering game. Adjustable reels and reel strips 510-540 may be generated or selected in a completely random fashion or using a look-up table using random elements. That is, the number and location of any designated adjusting reels, in addition to the composition, behavior, and display characteristics of each of the adjusting reels of the wagering game, including the reel strip employed, number of adjusting-symbol positions thereon, and the symbol display transitioning of each, are discretionary.

Figure 6:
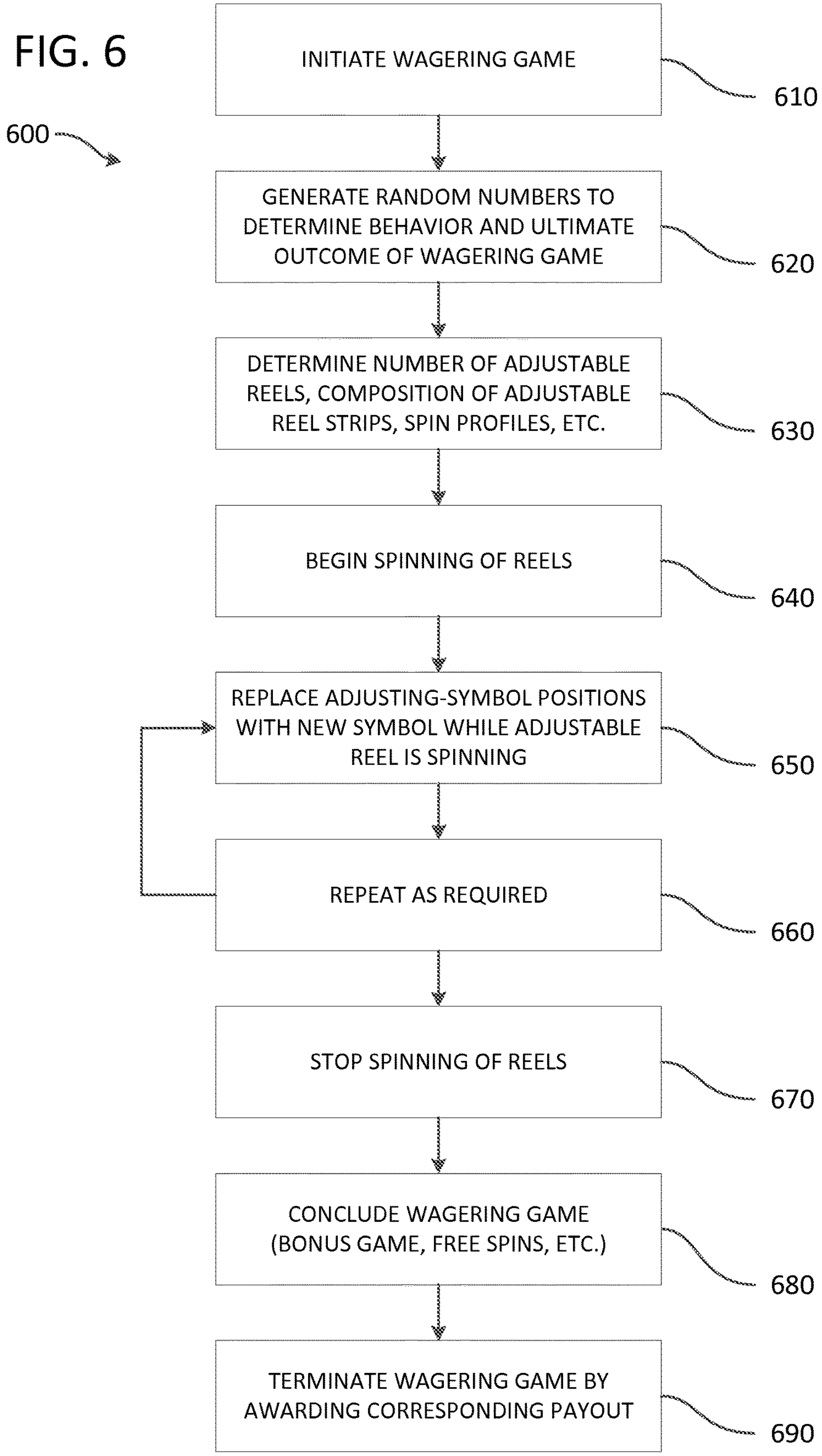
FIG. 6 is a flowchart for an algorithm that corresponds to instructions executed by a controller in accord with at least some aspects of the disclosed concepts.

FIG. 6, described by way of example above, represents one algorithm 600 that corresponds to at least some instructions stored and executed by the game-logic circuitry 40 in FIG. 2 to perform the above described functions associated with the disclosed concepts.

In step 610, the wagering game is initiated. This typically involves the commitment of a wager and the reception and interpretation of input from a user indicating the wagering game is to be performed, for example, by actuation of a "SPIN REELS" button. Initial wagering game accounting may occur, including the deduction of funds from a player credit meter, etc.

In step 620, one or more random elements are generated for the wagering game to indicate the parameters and eventual outcome of the wagering game. In one embodiment, the generated random elements include random numbers that determine the various attributes of the array elements of the symbol array 499 for the wagering game. For example, these may include the number of array elements using adjustable reels, the reel strip used for each array element of the symbol array 499, the number of adjusting symbol positions on each adjustable reel strip, sets of related or dependent array elements or reels, the reel strip(s) used on any adjusting reels for array elements, and the outcome symbol for the array elements of the symbol array. Other wagering game parameters that may impact the operation of the wagering game may also occur.

In step 630, the random elements are used to determine the various aspects of specific portions of the wagering game and how the wagering game will operate in this instance. For example, the random elements may dictate one or more random elements are required to determine the number of adjustable reels in the wagering game, the number of adjusting-symbol positions 550 on each adjustable reel, the composition of each adjustable reel (i.e., the reel strips 510-540 used in the wagering game), the symbol(s) the adjustable reels will transition between, and provide mappings to the reel stop positions for each of the reels of the wagering game. Many other aspects of the wagering game may be derived here, including, for example, mapping of reel stop positions to particular symbols of a particular game skin, spin profiles to dictate movement of the reels during the wagering game, ancillary presentation material based on game outcomes, etc.

In step 640, the reels of the wagering game begin spinning and are displayed at a corresponding array element of the symbol array 499 on one or more wagering game output devices for observation by the player. This may be accompanied with the display of one or more specified animation sequences, for example, initial or transitioning symbol display(s) for adjusting-symbol positions 550, adjustable reel designations, highlighting, anticipatory sequences, etc.

In step 650, as the spinning of the reels of the wagering game is occurring, the display of the adjusting symbols in the adjusting-symbol positions 550 of the adjusting reel strips 510 of one or more adjusting reels changes to enhance player anticipation of the wagering game outcome and the potential symbol outcome of the adjusting-symbol positions 550 on the adjusting reels. This may include the replacement of any current or prior displayed symbol presented at the adjusting-symbol positions of the one or more adjusting reels.

In step 660, if further symbol changes are indicated for the adjusting-symbol positions 550 on the reel strip(s) 510 of the one or more adjusting reels, flow returns to step 650 to replace the displayed symbol at these positions with a new symbol so that the new symbol is displayed on the adjusting reels. This may include additional animation, highlighting, sounds, etc. The transition of each of the adjusting symbols on the reel strips 510 of the one or more adjusting reels continues until no further changes are required at the adjusting-symbol positions 550 on the reel strip(s) 510 of the adjusting reels.

In step 670, the reels of the wagering game are stopped and an outcome of this portion of the wagering game can displayed to the player. This may also include a final transition of the adjusting-symbol positions 550 of the adjustable reel(s) to the final array element symbol outcome or a highlighting of the symbols presented in the adjusting-symbol positions 550. This step may also include display and celebratory processes to highlight one or more winning aspects of the wagering game, for example showing winning lines and payouts, etc.

In step 680, any procedures to be performed after the reels stop spinning are performed. This may include the initiation of one or bonus games, free spins, additional presentations or processes, or any combination of these.

In step 690, the wagering game is terminated, and the winning outcome(s) of the wagering game and bonus features are compiled and accounted. This may be accompanied by further graphical presentation in accordance with the wagering game outcome. The compilation of winnings is awarded to the player in proportion to the initial wager of the wagering game.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A casino gaming machine primarily dedicated to playing at least one casino wagering game, the casino wagering game including spinning a plurality of symbol bearing reels, the plurality of symbol bearing reels including at least one adjustable reel having an adjustable reel strip with one or more adjusting symbol positions thereon, the gaming machine comprising:

- a secure gaming cabinet for housing components associated with the casino wagering game;
- an electronic display device coupled to the gaming cabinet;
- an electronic input device coupled to the gaming cabinet, the electronic input device configured to receive a physical input from a player to initiate the casino wagering game and transform the input into an electronic data signal; and
- game-logic circuitry disposed within the gaming cabinet and including a random element generator, the random element generator configured to generate one or more random elements, the game-logic circuitry configured to:
  - initiate the casino wagering game in response to the electronic data signal from the electronic input device;
  - after initiation of the casino wagering game, select a first symbol and a second symbol from a plurality of symbols based, at least in part, on the one or more random elements;
  - determine an outcome of the casino wagering game based, at least in part, on the one or more random elements;
  - while spinning the at least one adjustable reel, replace any currently displayed symbol in the one or more adjusting symbol positions with the first symbol, thereby displaying the first symbol at the one or more adjusting symbol positions on the electronic display device;

while the spinning of the at least one adjustable reel continues, replace any currently displayed symbol in the one or more adjusting symbol positions with the second symbol, thereby displaying the second symbol at the one or more adjusting symbol positions on the electronic display device;

stop the plurality of reels to display a symbol combination of the game outcome, wherein the at least one adjustable reel displays the second symbol at the one or more adjusting symbol positions; and award an award in response to the game outcome meeting a predetermined award criterion.

2. The gaming machine of claim 1, further comprising a value input device disposed on the housing and used to fund the casino wagering game.

3. The gaming machine of claim 1, wherein the game-logic circuitry is further configured to, after displaying the first symbol at the one or more adjusting symbol positions and prior to displaying the second symbol at the one or more adjusting symbol positions, replace any currently displayed symbol in the one or more adjusting symbol positions with an intermediate symbol, thereby displaying the intermediate symbol at the one or more adjusting symbol positions on the electronic display device.

4. The gaming machine of claim 1, wherein the game-logic circuitry is further configured to select the second symbol from a plurality of symbols having a higher value than the first symbol.

5. The gaming machine of claim 1, wherein the one or more adjusting symbol positions are a plurality of successive adjusting positions on the at least one adjustable reel.

6. The gaming machine of claim 1, wherein a number of adjusting symbol positions is based on at least one of the one or more random elements.

7. The gaming machine of claim 1, wherein at least one adjusting symbol position on the at least one adjustable reel is determined based on at least one of the one or more random elements.

8. A gaming system primarily dedicated to playing at least one casino wagering game, the casino wagering game including spinning a plurality of symbol bearing reels, the plurality of symbol bearing reels including at least one adjustable reel having an adjustable reel strip with one or more adjusting symbol positions thereon, the gaming machine comprising:

a secure gaming cabinet for housing components associated with the casino wagering game;

an electronic display device coupled to the gaming cabinet;

an electronic input device coupled to the gaming cabinet, the electronic input device configured to receive a physical input from a player to initiate the casino wagering game and transform the input into an electronic data signal;

a random element generator configured to generate one or more random elements; and game-logic circuitry configured to:

initiate the casino wagering game in response to the electronic data signal from the electronic input device;

after initiation of the casino wagering game, select a first symbol and a second symbol from a plurality of symbols based, at least in part, on the one or more random elements;

determine an outcome of the casino wagering game based, at least in part, on the one or more random elements;

while spinning the at least one adjustable reel, replace any currently displayed symbol in the one or more adjusting symbol positions with the first symbol, thereby displaying the first symbol at the one or more adjusting symbol positions on the electronic display device;

while the spinning of the at least one adjustable reel continues, replace any currently displayed symbol in the one or more adjusting symbol positions with the second symbol, thereby displaying the second symbol at the one or more adjusting symbol positions on the electronic display device;

stop the plurality of reels to display a symbol combination of the game outcome, wherein the at least one adjustable reel displays the second symbol at the one or more adjusting symbol positions; and award an award in response to the game outcome meeting a predetermined award criterion.

9. The gaming system of claim 8, wherein the random element generator and the game-logic circuitry reside within the gaming cabinet.

10. The gaming system of claim 8, further comprising a value input device disposed on the housing and used to fund the casino wagering game.

11. The gaming system of claim 8, wherein the game-logic circuitry is further configured to, after displaying the first symbol at the one or more adjusting symbol positions and prior to displaying the second symbol at the one or more adjusting symbol positions, replace any currently displayed symbol in the one or more adjusting symbol positions with an intermediate symbol, thereby displaying the intermediate symbol at the one or more adjusting symbol positions on the electronic display device.

12. The gaming system of claim 8, wherein the game-logic circuitry is further configured to select the second symbol from a plurality of symbols having a higher value than the first symbol.

13. The gaming system of claim 8, wherein the one or more adjusting symbol positions are a plurality of successive adjusting positions on the at least one adjustable reel.

14. A method of operating a gaming system primarily dedicated to playing at least one casino wagering game, the casino wagering game including spinning a plurality of symbol bearing reels, the plurality of symbol bearing reels including at least one adjustable reel having an adjustable reel strip with one or more adjusting symbol positions thereon, the gaming system including a secure gaming cabinet, a random element generator, game-logic circuitry, an electronic display device, and an electronic input device, the electronic display device and the electronic input device being coupled to the gaming cabinet, the method comprising:

generating one or more random elements with the random element generator;

receiving, responsive to a physical input to the electronic input device, a wager input to initiate the casino wagering game, resulting in spinning the plurality of reels;

after initiation of the casino wagering game, selecting, by the game-logic circuitry, a first symbol and a second symbol from a plurality of symbols based, at least in part, on the one or more random elements;

determining, by the game-logic circuitry, an outcome of the casino wagering game based, at least in part, on the one or more random elements;

while spinning the at least one adjustable reel, replacing, by the game-logic circuitry, any currently displayed symbol in the one or more adjusting symbol positions with the first symbol, thereby displaying the first symbol at the one or more adjusting symbol positions on the electronic display device;

while the spinning of the at least one adjustable reel continues, replacing, by the game-logic circuitry, any currently displayed symbol in the one or more adjusting symbol positions with the second symbol, thereby displaying the second symbol at the one or more adjusting symbol positions on the electronic display device;

stopping, by the game-logic circuitry, the plurality of reels to display a symbol combination of the game outcome, wherein the at least one adjustable reel displays the second symbol at the one or more adjusting symbol positions; and awarding, by the game-logic circuitry, an award in response to the game outcome meeting a predetermined award criterion.

15. The method of claim 14, further comprising:

after displaying the first symbol at the one or more adjusting symbol positions and prior to displaying the second symbol at the one or more adjusting symbol positions, replacing, by the game-logic circuitry, any currently displayed symbol in the one or more adjusting symbol positions with an intermediate symbol, thereby displaying the intermediate symbol at the one or more adjusting symbol positions on the electronic display device.

16. The method of claim 15, further comprising selecting, by the game-logic circuitry, the intermediate symbol from a plurality of symbols having a higher value than the first symbol and having a lower value than the second symbol.

17. The method of claim 14, further comprising selecting, by the game-logic circuitry, the second symbol from a plurality of symbols having a higher value than the first symbol.

18. The method of claim 14, wherein the one or more adjusting symbol positions are a plurality of successive adjusting positions on the at least one adjustable reel.

19. The method of claim 14, wherein a number of adjacent adjusting symbol positions is based on at least one of the one or more random elements.

20. The method of claim 14, wherein at least one adjusting symbol position on the at least one adjustable reel is determined by the game-logic circuitry based on at least one of the one or more random elements.

* * * * *